United States Patent [19]

Nishi et al.

[11] Patent Number: 4,550,997

[45] Date of Patent: Nov. 5, 1985

[54] AUTOMATIC EXPOSURE CONTROL CIRCUIT

[75] Inventors: Kohichi Nishi, Yokohama; Akira Takahashi, Kawasaki, both of Japan

[73] Assignee: Ricoh Company, Ltd., Japan

[21] Appl. No.: 672,344

[22] Filed: Nov. 16, 1984

[30] Foreign Application Priority Data

Nov. 18, 1983 [JP] Japan .................................. 58-217575

[51] Int. Cl.⁴ .............................................. G03B 7/083
[52] U.S. Cl. ...................................... 354/459; 354/461
[58] Field of Search ........................... 354/21, 459-461

[56] References Cited

U.S. PATENT DOCUMENTS

| | | | |
|---|---|---|---|
| 3,429,242 | 2/1969 | Yoshida et al. | 354/459 |
| 3,683,767 | 8/1972 | Sahara et al. | 354/459 |
| 3,786,733 | 1/1974 | Kitai | 354/459 X |
| 3,798,644 | 3/1974 | Matsuda | 354/459 |
| 4,353,631 | 10/1982 | Takazawa et al. | 354/459 |

FOREIGN PATENT DOCUMENTS

| | | | |
|---|---|---|---|
| 54-632 | 5/1979 | Japan | 354/461 |
| 179825 | 11/1982 | Japan | 354/459 |

Primary Examiner—William B. Perkey
Attorney, Agent, or Firm—Guy W. Shoup

[57] ABSTRACT

An automatic exposure control circuit of a photographing camera having a shutter blade associated with an electromagnet driven by a driving circuit is disclosed, which is featured by having a film sensitivity information detector for detecting the film sensitivity electrically to provide an output signal, means responsive to the output signal for changing a reference voltage to be applied to the driving circuit and a γ value correcting means for correcting the reference voltage according to the γ value of a light receiving element of the camera.

1 Claim, 17 Drawing Figures

AUTOMATIC EXPOSURE CONTROL CIRCUIT

BACKGROUND OF THE INVENTION

The present invention relates to an automatic exposure control circuit for use in a photographic camera and, particularly, to such control circuit to be supplied with a film sensitivity information as an electric signal.

Figure 1:
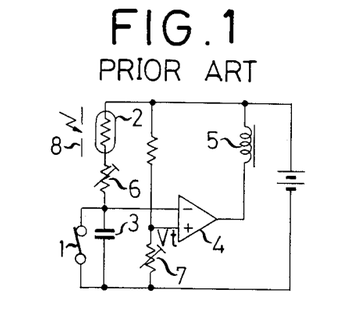
FIG. 1 is a circuit diagram showing an example of a conventional automatic exposure control circuit.

An automatic exposure control circuit for controlling an exposure time of a camera has been known which comprises an electromagnet for closing a shutter of the camera, a time constant circuit composed of a light receiving element and a capacitor for commencing an open motion of shutter blades while starting a charging of the capacitor and a driving circuit responsive to a charge voltage of the time constant circuit and a predetermined reference voltage for rendering the electromagnet to close the shutter when the charge voltage reaches the reference voltage. FIG. 1 shows an example of such automatic exposure control circuit, in which, when a camera shutter is started to open by means of a depression of a shutter release button, a trigger switch 1 ganged with the shutter release button is opened to allow a capacitor 3 to be charged through a light receiving element, e.g., CdS element 2. When a voltage of the capacitor 3 reaches a predetermined reference voltage Vt of a driving circuit 4, the latter blocks a current flow through an electromagnet 5 to close the shutter. A shutter opening time T between time instances of the turning off of the trigger switch 1 and of the deenergization of the electromagnet 5 is determined by a time constant of a time constant circuit composed of the CdS element 2 and the capacitor 3. Since a resistance value of the CdS element 2 depends upon an intensity of an incident light from an object to be photographed, the shutter opening time T varies with a variation of the incident light intensity according to the following equation.

$$T = C \cdot Ro \cdot 2^{-\gamma(X-Xo)} \cdot \ln \frac{Vcc}{Vcc - Vt} \quad (1)$$

where C is a capacitance of the capacitor 3, Ro is a resistance value of the CdS element 2 when the light intensity is Xo, $\gamma$ is a $\gamma$ value of the CdS element, x is the intensity of light fallen on the CdS element and corresponds to Ev value at ASA 100, Vcc is a source voltage and Vt is the reference voltage.

The control circuit in FIG. 1 further includes a resister 6 for high intensity correction and a resistor 7 for low intensity correction, a winder 8 for setting the film sensitivity being provided in front of the CdS element 2.

A preciseness of exposure obtained by the automatic exposure control circuit shown in FIG. 1 will be explained with reference to FIG. 2 in which various Ev-T curves and Lv-T curves are shown.

Figure 2:
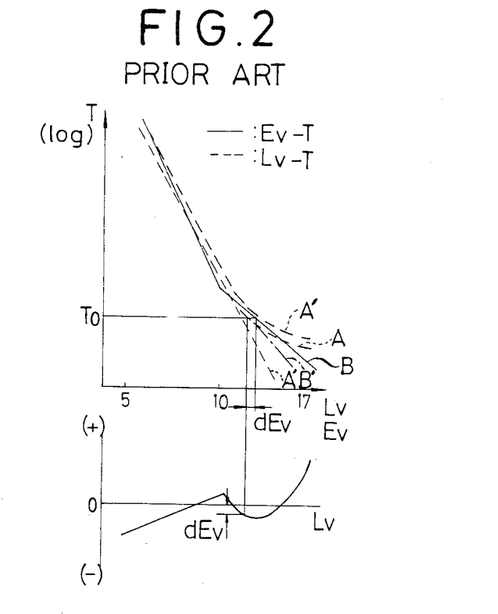
FIG. 2 shows the Ev-T and Lv-T curves of the exposure control circuit in FIG. 1 and the exposure error characteristics curves thereof.

In FIG. 2, the Ev-T curves show relations of the shutter opening time, i.e., the shutter speed T which is the time period between the turning off of the trigger switch 1 and the deenergization of the electromagnet 5 to the exposure value Ev (=diaphram value Av+shutter speed Tv) and are determined by a shutter mechanism. The Lv-T curves show relations of the time period T to a light value Lv (=incident light amount Bv+film sensitivity Sv) and are determined by the equation (1).

The preciseness of exposure or exposure error (dEv) can be represented by a difference between the Ev-T curve and the Lv-T curve.

Assuming that the control time is T when the CdS is irradiated with light whose intensity is Lv, the shutter mechanism provides the exposure amount Ev. If Lv=Ev in this case, the exposure error is 0. However, there is a difference between Lv and Ev, practically, and thus the exposure error dEv (=Lv−Ev) is produced as shown in a lower portion of FIG. 2.

The low intensity correction or the high intensity correction is performed to minimize the error dEv. The term "low intensity correction" used in this specification means a regulation of the error due to differences in the capacitor 3, the resistance Ro of the CdS element and the $\gamma$ value of the same etc. between cameras by changing the reference voltage Vt by a regulation of the resistance of the resistor 7 so as to minimize the error. That is, it is assumed that a curve A in FIG. 2 is the most preferable curve providing the minimum exposure error. When the characteristics of a certain camera is shown by a curve A′ which is deviated from the curve A by the differences in values of the constituting elements thereof from a camera having the characteristics curve A, the value of the resister 7 is reduced so that the curve A′ is shifted to the position of the curve A. Since, in this case, the regulation of the curve A′ to the curve A is performed as a whole, it may be enough to shift any one point on the curve A′ to a corresponding point on the curve A. Since such shift is usually performed for a point corresponding to around Lv 9, it is referred to as the low intensity correction.

On the other hand, the high intensity correnction intends to make the Lv-T curve close to the Ev-T curve. That is, the Ev-T curve is constituted with two segments, one being in a low intensity side which is stable for any camera and close to a corresponding portion of the Lv-T curve and the other being in a high intensity side which depends upon cameras and is substantially different from a corresponding portion of the Lv-T curve. A junction of the two segments corresponds substantially to a position in which the shutter blade is fully opened.

In order to minimize the error dEv it is necessary to make the Lv-T curve, particularly, the high intensity side portion thereof, as close to the corresponding portion of the Ev-T curve as possible. This can be achieved practically by regulating the resistance value of the resister 6 connected in series to the CdS element 2 of the circuit shown in FIG. 1.

Assuming the resistance value of the resister 6 as being r, the control time T can be represented according to the equation (1), as follow.

$$T = C(Ro \cdot 2^{-\gamma(X-Xo)} + r) \ln \frac{Vcc}{Vcc - Vt} \quad (2)$$

$$= C Ro \cdot 2^{-\gamma(X-Xo)} \ln \frac{Vcc}{Vcc - Vt} + C r \ln \frac{Vcc}{Vcc - Vt}$$

Therefore, it is possible to make the Lv-T curve overlapped with the Ev-T curve by regulating the value of only the term C r ln Vcc/(Vcc-Vt) by changing the resistance value r of the resister 6. Since the portion of the Lv-T curve which is changed as above corresponds to the light value (Lv) of around 15, this regulation is referred to as the high intensity correction.

In this manner, the variations of the circuit constants such as the capacitance of the capacitor and the $\gamma$ value of the CdS element etc. of the control circuit and/or mechanical variations of camera are corrected.

On the other hand, an information of the film sensitivity which is one of parameters necessary to operate the control circuit appropriately is given as a change in a diameter of the window 8 formed in front of the CdS element 2 and is supplied, together with the amount of the incident light, to the control circuit as $Lv=Bv+Sv$. Such input of the film sensitivity information through the light receiving window 8 for the CdS element to the control circuit can be represented by the Lv-T curve shifted horizontally.

Figure 4:
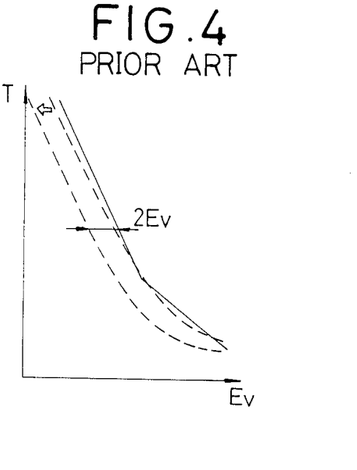
FIG. 4 shows the Ev-T curves obtainable when the film sensitivity is switched in the circuit shown in FIG. 1.

In a case where ASA100 is selected as a reference, for example, a case of ASA400 can be represented by the Lv-T curve shifted leftwardly by 2Ev, as shown in FIG. 4.

In any way, however, the film sensitivity information has to be input to the control circuit manually, i.e., by changing the size of the opening of the window 8 manually according to the sensitivity of a film loaded.

In order to make an automatic input of the film sensitivity information to the control circuit possible, an idea has been proposed that an electric contact coded according to the film sensitivities is provided preliminarily on a patrone of a film to be loaded and, when loaded, a code signal is derived from the electric contact, on which the sensitivity of the loaded film is detected and supplied to the control circuit automatically according to which various parameters of the circuit are changed.

This proposition seems to be very effective. However, any construction for practicing this idea has not been proposed as yet.

Figure 3:
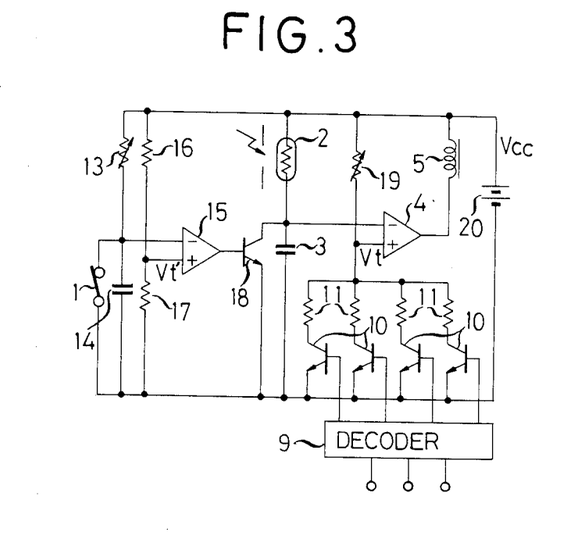
FIG. 3 is a circuit diagram of an embodiment of the present invention.

That is, a construction of the control circuit for practicing the idea may be one shown in FIG. 3, in which a coded film sensitivity signal derived from the contact on the patrone of a certain film loaded is supplied to a decoder 9. An output of the decoder 9 which corresponds to one of the film sensitivities is supplied to a corresponding one of switching transistors 10 to turn it on to thereby connect a corresponding one of resisters 11 to a reference voltage input of the driving circuit 4. Thus, a reference voltage suitable for the sensitivity of the loaded film can be established at the reference voltage input of the driving circuit 4. The switching of the reference voltage one to another in response to the film sensitivity can be represented by a vertical shaft of the Lv-T curve, as mentioned previously.

Figure 5:
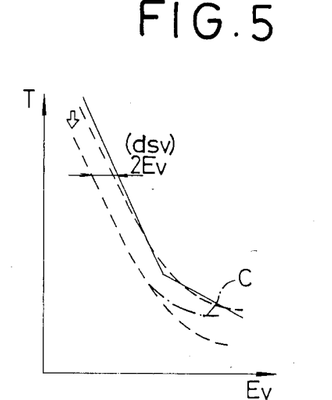
FIG. 5 shows the Ev-T curves for explanation of the effect of a variation of the γ value of a light receiving element when the film sensitivity is switched by switching a reference voltage.

However, a mere vertical shift of the Lv-T curve causes various problems to occur, which are as follows:

Firstly, when the curve is shifted vertically by a difference dSv in the film sensitivity with a reference being set in the low intensity side, there is provided in the high intensity side a difference which in larger than the value dSv, causing an exposure error, as shown in FIG. 5. That is, when the amount of shift in the low intensity side is 2Ev, the amount of shift in the high intensity side which should be 2Ev as shown by a curve C is much larger than 2Ev.

Figure 6:
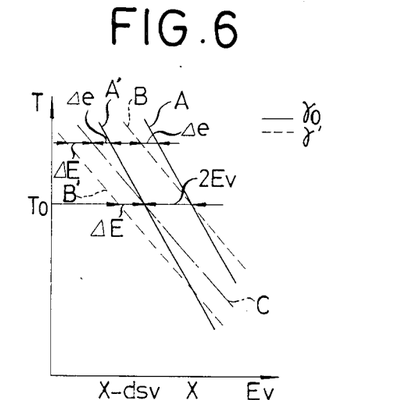
FIG. 6 shows the Ev-T curve of a camera mechanism as well as the Lv-T curve adaptable thereto.

Secondly, because of a variation of the $\gamma$ value of the CdS element, the larger the difference between the sensitivity of a film to be loaded and the reference film sensitivity provides the larger the exposure error, as shown in FIG. 6. In FIG. 6, a curve A shows the Ev-T curve of a camera mechanism as well as the Lv-T curve adaptable thereto, where the $\gamma$ value of the CdS element is $\gamma o$ and the film sensitivity is ASA100, and a curve A' shows those for ASA400. In this case, if there is no variation of the $\gamma$ value of the CdS element, the curves A and A' are parallel. However, there is a variation of the CdS element camera by camera, practically.

Assuming that the $\gamma$ value of a certain CdS element is not $\gamma o$ but $\gamma'$ and a curve B is obtained as shown in FIG. 6, a regulation is performed at a shutter speed To at which the curves A and B crosses. The exposure error at a certain shutter speed is e.

When the switching of the film sensitivity to ASA400 is performed by changing the window size of the CdS element as in the conventional manner, the curve B is merely parallel-shifted resulting in a curve C. Therefore, the exposure error at the certain shutter speed is $\Delta e$.

On the other hand, when the switching is performed by changing the reference voltage Vt of the driving circuit as mentioned, the amount of parallel-shift is increased, resulting in a curve B' as shown in FIG. 6. Thus, an additional exposure error $\Delta E$ is included, which increases with an increase of the difference in film sensitivity.

Finally, there must be a low intensity correction means provided additionally since the switching of the reference voltage Vt which is used for the low intensity correction in the conventional system is used as the film sensitivity switching.

SUMMARY OF THE INVENTION

An object of the present invention is the provide an automatic exposure control circuit for a photographic camera in which the film sensitivity is switched electrically, which is capable of performing both the high intensity correction and the low intensity correction and eliminating any exposure error due to a variation of the $\gamma$ value of a light receiving element of the camera.

According to the present invention, the above object can be achieved by a provision of an automatic exposure control circuit including an electromagnet for rendering a camera shutter to be closed when energized, a time constant circuit composed of a light receiving element and a capacitor and responsive to a commencement of a shutter opening operation of the camera to start a charging of the capacitor and a driving circuit having inputs supplied with a charge voltage of the capacitor and a predetermined reference voltage, respectively, and responsive to the charge voltage reached the reference voltage to energize the electromagnet to thereby close the shutter blade, a film sensitivity information detector for detecting a film sensitivity information electrically and providing an output signal according to a detected film sensitivity information, a film sensitivity switching portion responsive to the output signal from the film sensitivity information detector to change the reference voltage to be supplied to the driving circuit and a $\gamma$ value correction responsive to the $\gamma$ value of the light receiving element to change a voltage to be applied to the film sensitivity switching portion to thereby correct the reference voltage to be applied to the driving circuit.

DESCRIPTION OF THE PREFERRED EMBODIMENTS

In FIG. 3, a time constant circuit composed of a variable resister 13 and a capacitor 14 is provided in addition to a time constant circuit composed of a CdS element 2 and a capacitor 3. A trigger switch 1 is connected in parallel to the capacitor 14. A charge voltage of the capacitor 14 is compared in a comparator 14 with a reference voltage $Vt'$ applied thereto through voltage dividing resisters 16 and 17. An output of the comparator 15 is supplied to a base of a switching transistor 18 which serves as a trigger switch for the capacitor 3.

A charge voltage of the capacitor 3 is applied to a driving circuit 4 to which a reference voltage $Vt$ corresponding to a resistance value of one of resisters 11 is also applied. The resister is selected according to a film sensitivity signal detected electrically through a decoder 9 and a transistor 10, as mentioned previously.

The control circuit in FIG. 3 further includes an electromagnet 5 adapted to be driven by the driving circuit 4, a voltage dividing resister 19 connected in series with the resisters 11 and a power supply 20.

In operation, when the trigger switch 1 is turned off, the capacitor 14 is charged through the resister 13. When the charge voltage increases and becomes equal to the reference voltage $Vt'$, the comparator 15 provides an output by which the transister 18 is turned off to charge the capacitor 3 of the time constant circuit composed of the capacitor 3 and the Cd element 2.

Thereafter, as in the same manner as that of the conventional circuit, the current supply to the electromagnet 5 is blocked when the charge voltage of the capacitor 3 becomes equal to the reference voltage $Vt$ of the driving circuit 4 and thus the shutter is allowed to close.

That is, the feature of the present invention resides in the use of the pair of time constant circuits. The control time T obtained by the circuit construction of the present invention can be represented as follow:

$$T = C_2 Ro \cdot 2^{-\gamma(X-Xo)} \ln \frac{Vcc}{Vcc - Vt} + C_{1r} \ln \frac{Vcc}{Vcc - Vt'} \quad (3)$$

As is clear from the equation (3), the time to be controlled by the first time constant circuit and the comparator 15 is given by a second term of the left side of the equation. Since this term is independent from the reference voltage of the driving circuit 4 which is changed according to a change of the film sensitivity, it is possible to perform the high intensity correction by using this term. The curve C in FIG. 5 shows the Ev-T characteristics when the high intensity correction is performed thereby. The degree of the high intensity correction may be performed by regulating the resister 13 to change the time constant. Alternatively, it may be possible to perform this by regulating the resisters 16 and 17 to change the reference voltage $Vt'$.

Next, the correction of a variation of the γ value of the light receiving element will be described.

Assuming the film sensitivity of ASA100 being a reference, the exposure control time T with respect to a brightness x can be represented by the equation (1) or (2). However, since, in this case, a factor affecting a reduction of voltage is neglected, the reference voltage is given practically as follow:

$$ai = Vti/Vcc \quad (4)$$

Thus, $$T = C_1 R_1 \ln 2 - C_2 Ro 2^{-\gamma(X-Xo)} \ln(1-ai) \quad (5)$$

The selection of the reference voltage $ai$ for a given film sensitivity is performed as follows. Assuming that the reference voltage for the reference film sensitivity is given by $ao$ and the reference voltage for the sensitivity of a film which differs from the reference film sensitivity by $dSv$ is given $a$ and that the brightness corresponding to the reference voltage $ao$ is x and that corresponding to the reference voltage $a$ is (x-dSv), the following equation is established from the equation (5) since the exposure control time is common.

$$2^{-\gamma(X-Xo)}\ln(1-60 o) = 2^{-\gamma(X-dSv-Xo)}\ln(1-a)$$

Thus, $$a = 1-(1-ao)^{2^{-\gamma dSv}} \quad (6)$$

As in clear from the equation (6), $a$ is determined by not only $ao$ and $dSv$ but also the γ value of the light receiving element. That is, if i is determined without considering the γ value, the exposure error is increased. For example, where $\gamma=0.6$, ASA100 and $\gamma o=0.93$, the reference voltage for ASA1000, the film sensitivity difference $dSV$ being given by $$dSv = \log 2(1000/100) = 3.322 \quad (7)$$

the value can be calculated from the equation (6) as follow:

$$\alpha = 0.4872 \quad (8)$$

When the $\gamma$ value is changed to 0.5 with the reference voltage being unchanged, the film sensitivity difference dSv can be calculated from the equation (6) as $$dSv = \ln\left(\frac{\ln(1-\alpha o)}{\ln(1-\alpha)}\right) / \gamma \ln 2 \quad (9)$$

$$= 3.987$$

resulting in an exposure error of 0.665Ev due to the $\gamma$ value of the light receiving element.

Figure 7:
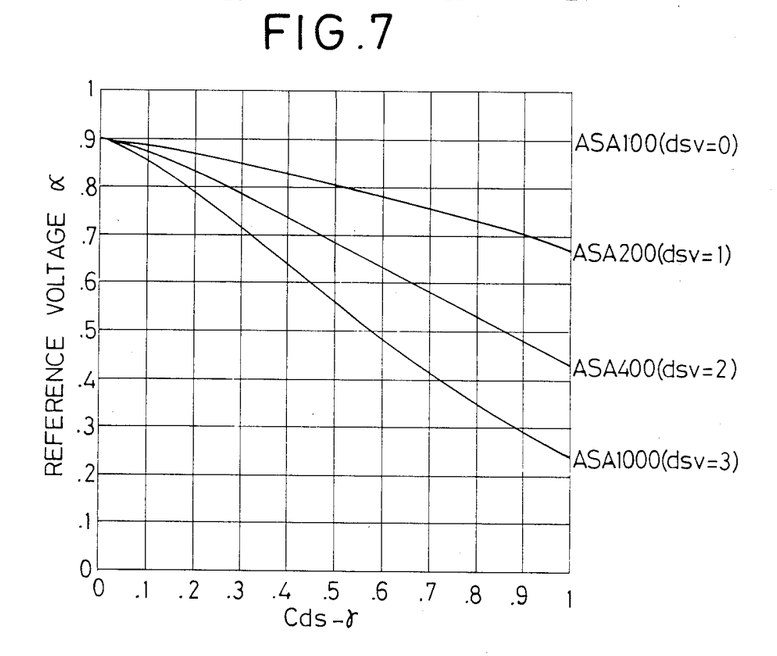
FIG. 7 shows characteristics curves showing a relation between the γ value of the light receiving element and the reference voltage of a driving circuit for every film sensitivity difference.

FIG. 7 shows a relation between the $\gamma$ value of the light receiving element, i.e., CdS element and the value of $\alpha$ with the ASA number being a parameter with respect to the reference of ASA100 ($\alpha o = 0.9$).

As is clear from FIG. 7, since the $\alpha$ is deemed as being linearly related to the $\gamma$ value within a certain range, it can be represented as $$\alpha = a - b\gamma \quad (10)$$

where a and b are constants (a, b, $\gamma \geq 0$).

Figure 9:
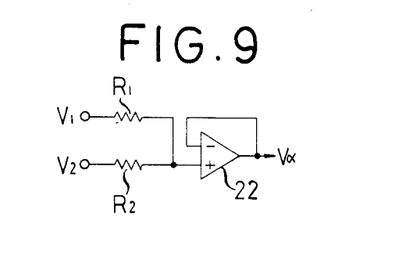
FIG. 9 is a circuit diagram showing an example of a γ value correction circuit to be used in the present invention.

FIG. 9 shows an equivalent circuit to the equation (10). The equivalent circuit in FIG. 9 is an adder circuit comprising an operational amplifier 22 and resisters R1 and R2 and when voltages V1 and V2 are applied to the resisters R1 and R2, respectively, the amplifier 22 provides an output V2 which is as follow:

$$V\alpha = \frac{R_2}{R_1 + R_2} V1 + \frac{R_1}{R_1 + R_2} V2 \quad (11)$$

$$= \frac{R_1 Vcc + R_2 V1}{R_1 + R_2} - \frac{R_1}{R_1 + R_2}(Vcc - V2)$$

Therefore, $$a = \frac{R_1 + R_2 \frac{V1}{Vcc}}{R_1 + R_2} \quad (12)$$

$$b\gamma = \frac{R_1}{R_1 + R_2}\left(1 - \frac{V2}{Vcc}\right) \quad (13)$$

Figure 10:
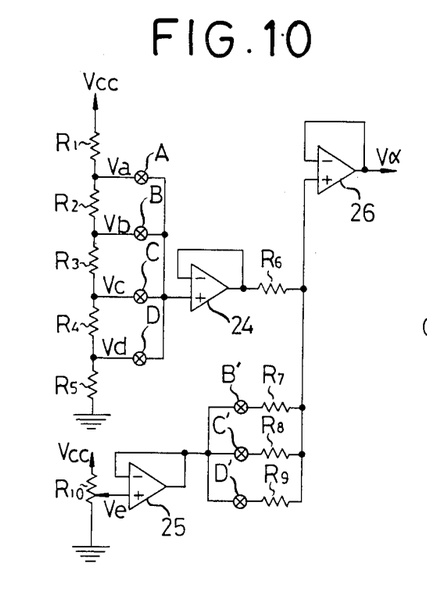
FIG. 10 is a circuit diagram of another example of the γ value correction circuit.

FIG. 10 shows an example of circuit constructed according to the equations (12) and (13) for the ASA numbers of 100, 200, 400 and 800. In FIG. 10, series connected resisters R1, R2, R3, R4 and R5 constitute a voltage divider for dividing the source voltage Vcc into Va, Vb, Vc, and Vd one of which is selected by means of analog switches A, B, C and D and supplied to a voltage follower amplifier 24 an output of which is supplied through one of resisters R7, R8 and R9 selected by selectively turning on any of analog switches B', C' and D' to an amplifier 26. An output of the latter is supplied to the driving circuit of the electromagnet as the reference voltage Vα.

The analog switches are on-off controlled through a decoder according to the film sensitivity informations which are electrically detected automatically such that, when the sensitivity is ASA100, the switch A is turned on, when ASA200, the switches B and B' are turned on, when ASA400, the switches C and C' are turned on and, when ASA800, the switches D and D' are turned on, respectivly.

With this construction, it becomes possible to correct the reference voltage of the driving circuit with respect to the respective film sensitivities by merely changing the voltage Ve, which, in turn, is determined by regulating a variable resister R10 according to a variation of the $\gamma$ value of the CdS element. Therefore, it is possible to eliminate the exposure error due to the variation of the $\gamma$ value of the CdS element.

As to means for eliminating exposure error due to a variation of the $\gamma$ value of the light receiving element in the case of the electrical film sensitivity switching, the relations between the $\gamma$ value of the CdS element and the $\alpha$ value when o in the equation is 0.9 and the film sensitivity difference dSv in the same 1, 2 and 3, respectively, are as shown in FIG. 7. Since the curves each for a different film sensitivity difference are linear within certain ranges, respectively, as mentioned previously, $\alpha_1$ and $\alpha_2$ can be represented by simple equations of $\alpha_3$ when the latter is made correspondent to the value, respectively, which are approximated according to the equation (6) by the following equations where k1 and k2 are constants:

$$\alpha_1 = 1 - k_1(1 - \alpha_3) \quad (14)$$

$$\alpha_2 = 1 - k_2(1 - \alpha_3) \quad (15)$$

Figure 8:
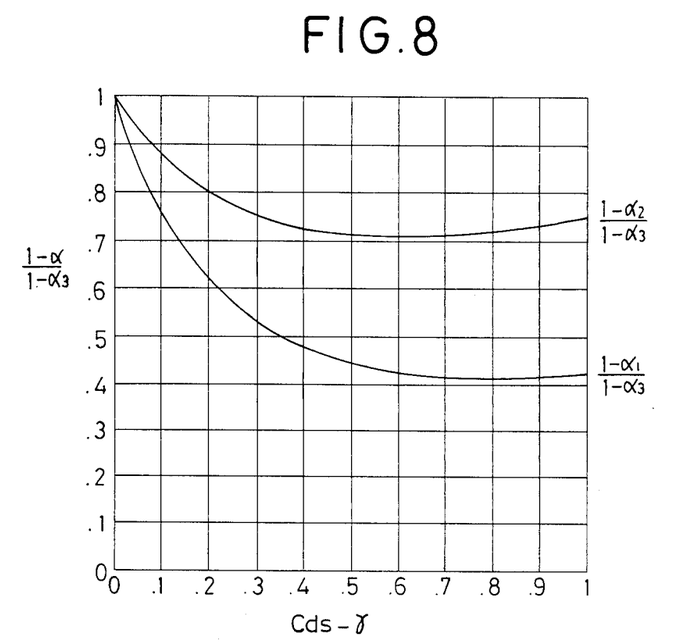
FIG. 8 shows characteristics curves showing a relation between the γ value of the light receiving element and a reference voltage ratio.

FIG. 8 shows relations between the value and $(1-\alpha_1)/(1-\alpha_3)$ and $(1-\alpha_2)/(1-\alpha_3)$ respectively. In a range of the $\gamma$ value of from 0.5 to 1 which is used usually, the relations are substantially linear and, therefore, it is possible to determine the constants k1 and k2, substantially.

Figure 11:
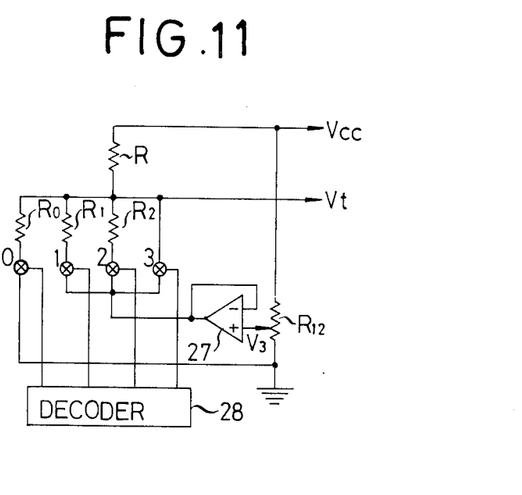
FIG. 11 is another example of the γ value correction circuit.

FIG. 11 is an example of a circuit constructed according to the concept shown in FIG. 8. In FIG. 11, a source voltage Vcc in divided by a variable resister R12 to obtain a voltage V3 which is supplied to a voltage follower amplifier 27. A decoder 28 which is supplied with the film sensitivity information in the form of electric signal, selectively turns on one of analog switches 0, 1, 2 and 3. When the switch 0 is turned on thereby, the source voltage Vcc is divided by a series connected resisters R and RO to provide a reference voltage Vt and, when the switch 1 is turned on, a voltage determined by the source voltage Vcc, the voltage V3 and the resister R and a resister R1 is provided as the reference voltage Vt. The voltage Vt is determined by the voltages Vcc and V3 and resisters R and R2 when the switch 2 is turned on and the reference voltage Vt becomes V3 when the switch 3 is turned on.

A bridge circuit is constituted with the variable resister R12 and the resisters R and any one of the resisters R0, R1 and R2 and the reference voltage Vt is derived from a center point of the bridge circuit. Ratios of these resisters are determined as follows:

$$\alpha 0 = \frac{V0}{Vcc} = \frac{R0}{R + R0} \quad (16)$$

$$\alpha 1 = \frac{V1}{Vcc} = \left\{\frac{R1}{R + R1}(Vcc - V3) - V3\right\}/Vcc \quad (17)$$

$$= 1 - \frac{R}{R + R1}(1 - \alpha 3)$$

-continued $$a2 = \frac{V2}{Vcc} = 1 - \frac{R}{R + R1}(1 - a3) \quad (18)$$

$$a3 = \frac{V3}{Vcc} \quad (19)$$

From the equations (14), (15), (17), and (18), $$k1 = \frac{R}{R + R1} \quad (20)$$

$$k2 = \frac{R}{R + R2} \quad (21)$$

are obtained from which circuit constants of the circuit in FIG. 11 can be easily determined.

The error correction is performed by this circuit such that, when a certain time To is obtained with respect to a certain brightness xo with dSv being 0, the dSv is switched to 3 to make the CdS brightness (xo−3) Ev and the variable resister R12 is regulated to make the time To.

Figure 12:
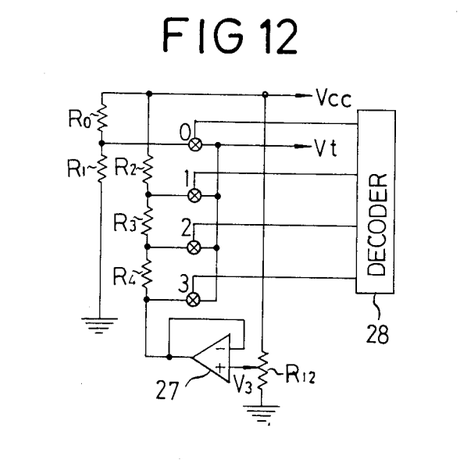
FIG. 12 is a further example of the correction circuit.

FIG. 12 shows another example of the circuit which is similar to that in FIG. 11. In FIG. 12, an input voltage V3 to an amplifier 27 is derived from a source voltage Vcc by a variable resister R12 in the same manner as in the circuit in FIG. 11. The variable resister R12 and resisters R0 and R1 constitute a bridge circuit from a center of which a reference voltage Vt is derived. The voltage V3 is divided by resisters R2, R3 and R4 and resulting voltages are selectively added to the reference voltage by analog switches controlled by a decoder 28 to perform a necessary correction.

Figure 13:
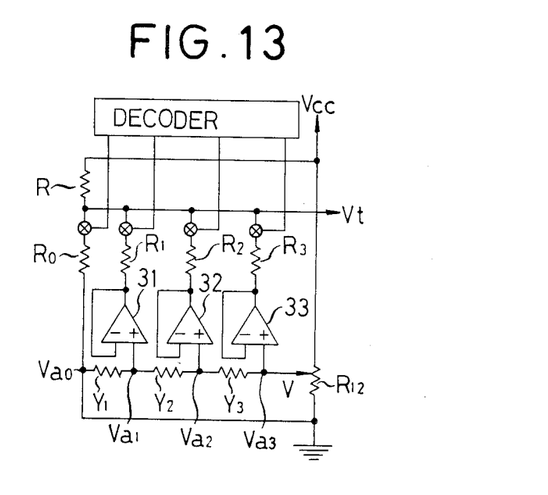
FIG. 13 is a still further example of the correction circuit.

FIG. 13 is a further example of the circuit for performing the correction in which a reference voltage Vt is derived from a center of a bridge circuit constituted with a variable resister R12 and resisters R0 and R. A voltage V4 which is derived from the variable resister R12 is divided by resisters r1, r2 and r3 and resultant voltages are supplied to amplifiers 31, 32 and 33, respectively, so that any of these voltages is selectively added to the reference voltage Vt through one of the resisters R1, R2 and R3 according to a selected film sensitivity.

The high intensity correction and the correction of the γ value of the light receiving element have been described hereinbefore. As to the low intensity correction, the regulation of the window diameter of the light receiving element which has been used for the switching between film sensitivities is used therefore in this invention. The regulation of the window diameter may be performed by moving a plate having a plurality of holes of different diameters and disposed in front of the light receiving element or by changing filters. Of course other means may be used for that purpose.

With a combination of the various corrections mentioned hereinbefore, a highly precise exposure control is obtained in the exposure control circuit of the type in which the film sensitivity information is electrically inputted.

Figure 14:
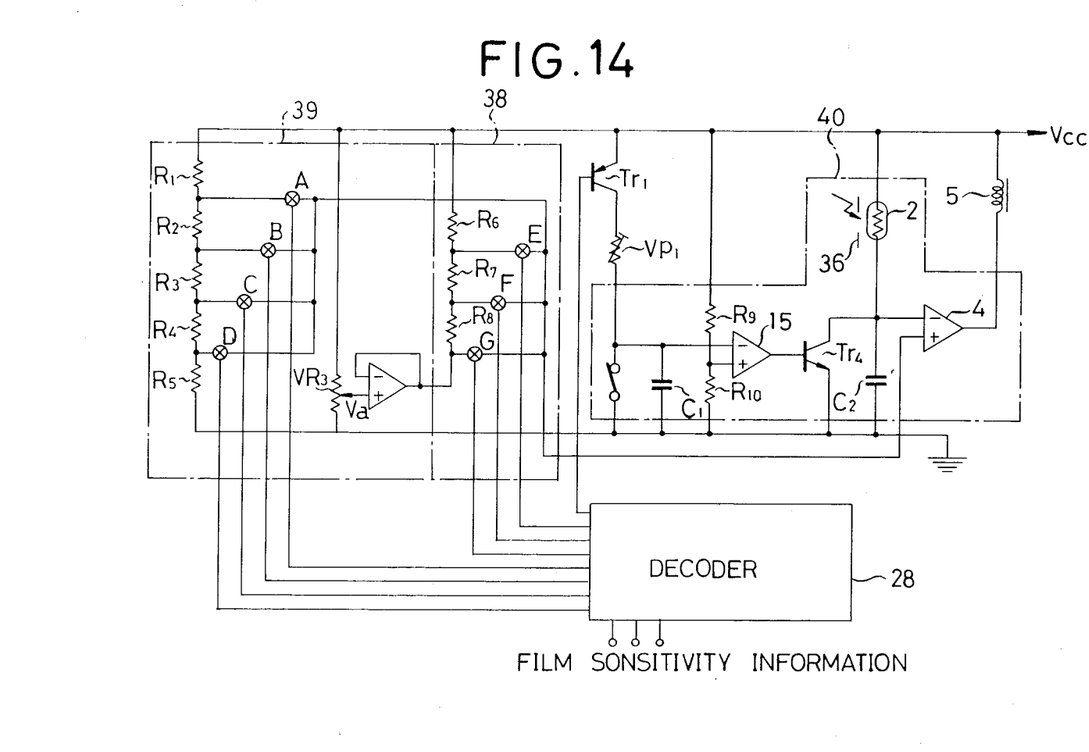
FIG. 14 is a circuit diagram showing another embodiment of the present invention.

FIG. 14 shows an embodiment of an exposure control circuit equipped with all of the correction means described hereinbefore. In FIG. 14, the exposure control circuit comprises a film sensitivity switching portion 38 for changing a reference voltage to be supplied to a driving circuit 4 according to an electric signal from a decoder 28 which serves as a film sensitivity detector, a γ value correcting portion 39 for correcting the reference voltage according to a variation of the γ value of a light receiving element, a high intensity correcting portion 40 including a pair of time constant circuits and a low intensity correcting portion 36 provided in front of the light receiving element.

Figure 15:
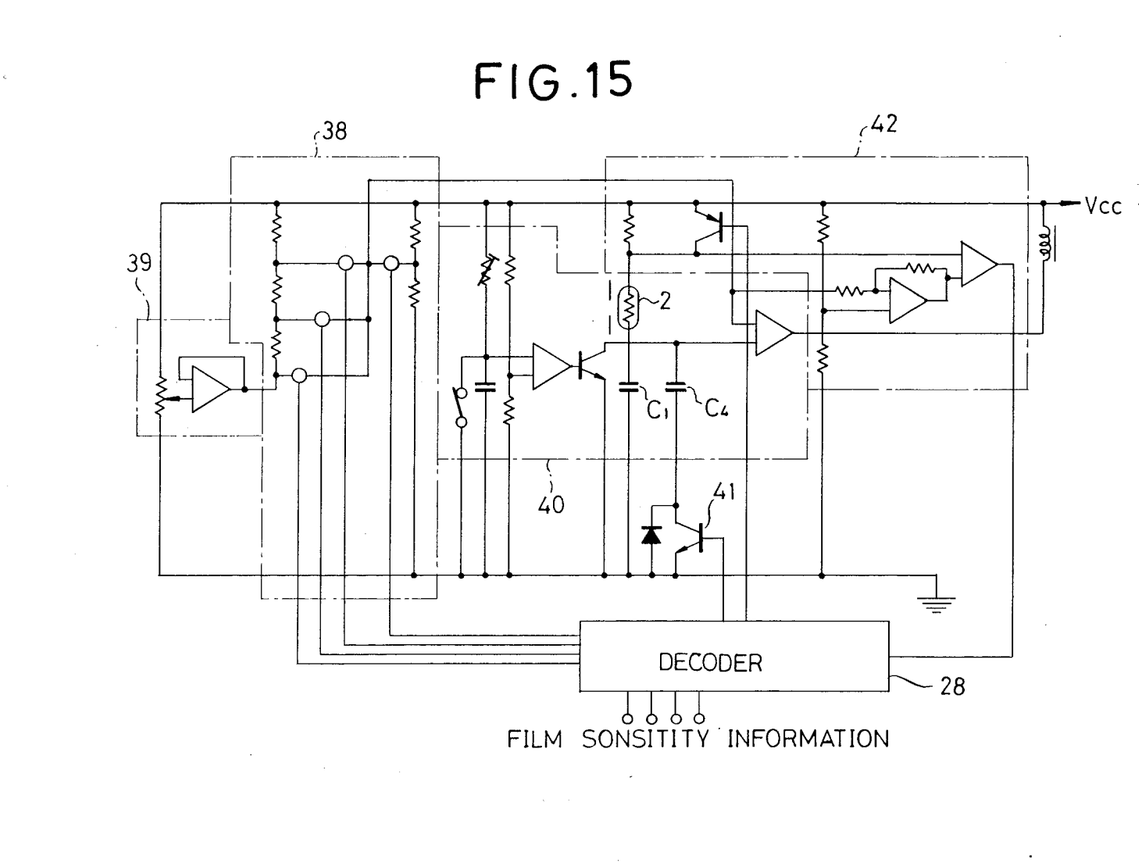
FIG. 15 is a circuit diagram showing a further embodiment of the present invention.

FIG. 15 shows another embodiment of the exposure control circuit which is similar to that shown in FIG. 14 except that a capacitor C4, a transistor 4 and a low intensity detector 42 are further provided.

The provision of the capacitor C4 and the transistor 41 are to expand a sensitivity range of film to be used. As can be seen from FIG. 7, the range of the reference voltage Vt is preferrably from 0.35 to 0.95, taking in a source voltage variation into consideration. The transistor 41 is turned on through the decoder 28 when the sensitivity of the film used in beyond a certain range to insert the capacitor C4 in parallel with the capacitor C1 which, together with the light receiving element 2, constitutes the time constant circuit to thereby increase the time constant, so that such high film intensity becomes acceptable.

Figure 16:
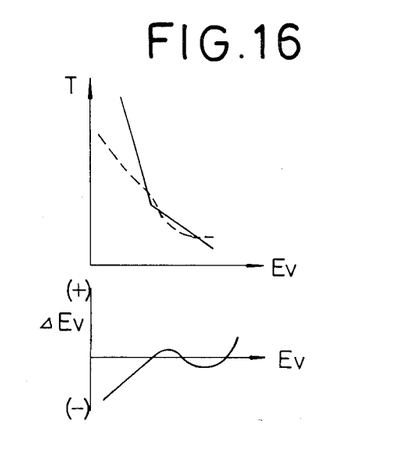
FIG. 16 shows the Ev-T curves and the exposure error curves for explanation of a possibility of limitation of photographying area in the low intensity side, dependent on the γ value of the light receiving element.
Figure 17:
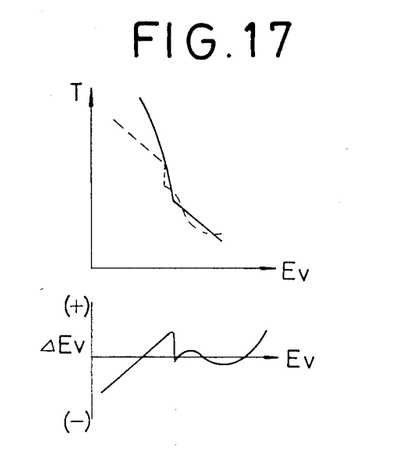
FIG. 17 shows the Ev-T curves and the exposure error curves showing a case where the photographying area in enlarged in the low intensity side.

The provision of the low intensity detector 42 is to expand the low intensity side range in which it is possible to photograph. When the γ value of the light receiving element is around 0.5, an underexposure condition is established in the low intensity side as shown in FIG. 16. According to this embodiment, a light intensity within a certain range in the low intensity side is detected by the low intensity detector 42 upon which the transistor 41 is turned on through the decoder to insert the capacitor C4 in parallel to the capacitor C1, as in the case of the expansion of the film sensitivity range, to thereby expand the control time so that the photographing range in the low intensity side is automatically expanded. FIG. 17 shows the effect of the provisions of the series circuit of the capacitor C4 and the transistor 41 and the low intensity detector 42. That is, the Ev-T curve shown by a dotted line has a steppingly changing portion in the low intensity side thereof which is obtained by the insertion of the capacitor C4.

According to the present invention, in an automatic exposure control circuit of a photographing camera, an operation of which is automatically changed according to an electrically detected film sensitivity information, a film sensitivity information detector for electrically detecting the film sensitivity and providing an output signal corresponding to the detected film sensitivity information, a film sensitivity switching portion responsive to the output signal for changing a reference voltage to be applied to a driving circuit of the camera and a γ value correcting portion responsive to a γ value of a light receiving element for correcting a voltage to be applied to the film sensitivity switching portion to thereby correct the reference voltage are provided. With this construction of the present invention, not only the effect of the automatic switching of film sensitivity but also the effect of the correction of error due to a variation of the γ value of the light receiving element of the camera can be obtained, resulting in that a precise exposure control can be performed.

What is claimed is:

1. An automatic exposure control circuit of a photographing camera including an electromagnet for closing a shutter blade thereof when energized, a time constant circuit having a light receiving element and a capacitor for charging said capacitor upon an opening operation of said shutter and a driving circuit having inputs supplied with a charge voltage of said capacitor and a predetermined reference voltage for actuating said electromagnet to close said shutter blade when said charge voltage becomes equal to said reference voltage, comprising a film sensitivity information detector for electrically detecting the film sensitivity information to provide an output signal corresponding to the film sensitivity information detected, a film sensitivity switching means responsive to said output signal from said film sensitivity information detector for changing said reference voltage to be applied to said driving circuit and a $\gamma$ value correcting means responsive to a $\gamma$ value of said light receiving element for correcting a voltage to be applied to said film sensitivity switching means and hence said reference voltage to be applied to said driving circuit.

* * * * *